April 1, 1930.                E. HIBBERT                1,752,845
                     TIRE FOR MOTOR VEHICLE WHEELS
                       Original Filed Sept. 19, 1924
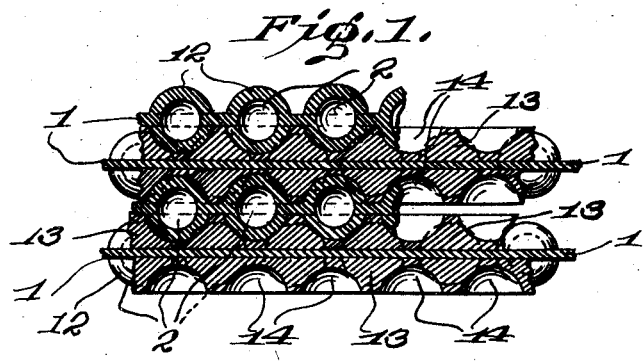
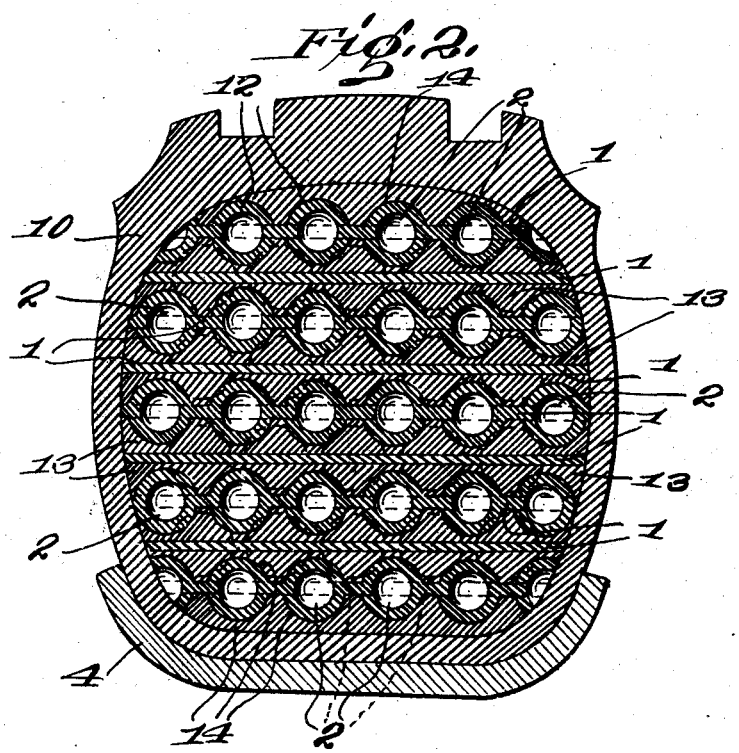
Inventor
Ernest Hibbert
By B. Singer
       Attorney Patented Apr. 1, 1930

1,752,845

UNITED STATES PATENT OFFICE

ERNEST HIBBERT, OF GOULBURN, NEW SOUTH WALES, AUSTRALIA

TIRE FOR MOTOR VEHICLE WHEELS

Original application filed September 19, 1924, Serial No. 738,639, and in Australia May 29, 1924. Divided and this application filed January 29, 1926. Serial No. 84,719.

This invention relates to improvements in resilient tires for motor and other vehicles, the object being to provide an improved tire having an elastic core provided with air filled cells which are distributed uniformly throughout the core from side to side and from top to bottom and which improved tire is very strong and durable, is efficient in operation and can be manufactured at moderate cost.

The present invention contemplates the provision of preferably semi-vulcanized rubber webbing having hemispherical cavities on each side thereof, such webbing being adapted to be interposed between each layer of the cell bands, the hemispherical projections on each side thereof being adapted to be recesesd or received in said hemispherical cavities in the webbing.

This specification is a division of the specification in Letters Patent of the United States No. 1,643,848 which was granted to me for a method of manufacturing a tire for motor vehicle wheels September 27, 1927, on an application filed September 19, 1924, Serial Number 738,639.

Referring now to the accompanying drawing, Figure 1 is a sectional view showing the rubber webbing having hemispherical depressions inserted between two adjacent layers of the cell bands, Figure 2 is a cross sectional elevation of the finished tire.

My improved tire comprises a core and a casing 10. The casing is here shown as fitted in a rim 4 and is preferably made as described in my said patent. The core is composed of cell bands 1 and filler rubber webbing strips 13. Each cell band is made of rubber and is provided with spherical cells 2 spaced apart, the hemispherical portions 12 of which project from opposite sides of the band. The cells 2 are filled with compressed air. The cell bands are arranged concentrically and extend longitudinally around the wheel and are also so arranged that the cells of each band are in staggered relation to those of the next adjacent band so that the cells of each band are arranged in the spaces formed between the cells of the next adjacent band. To entirely fill the spaces between the cell bands I provide rubber webbing strips 13 which are interposed between the cell bands 1 and are provided with hemispherical cavities 14 which receive the projecting portions 12 of the cell bands, as shown.

The cell bands 1 are made as described in my said Patent No. 1,643,848, and these bands 1 are separated in the construction of the tire by interposed strips of rubber webbing 13 having hemispherical cavities 14 on each side thereof into which are adapted to be recessed the respective halves 12 of the cells 2 of the cell bands 1. The said bands 1 and interposed strips of rubber webbing 13 are built up to form a core, the top and bottom webbing bands 13 having no depressions on the outer surfaces to give better gripping surfaces. No solution other than is necessary to give the cavity bands a holding surface need be generally used.

Claims:

1. A tire having a core comprising a plurality of longitudinally wound concentrically arranged cell bands of elastic material each cell band extending in width laterally from side to side of the core and having compressed air filled cells spaced apart and which project from opposite sides of the band, the cells of the respective bands being arranged in staggered relation so that each cell of one band is arranged in the space formed between the cells of the next adjacent band.

2. A tire having a core comprising a plurality of longitudinally wound concentrically arranged cell bands of elastic material each cell band extending in width laterally from side to side of the core and having compressed air filled cells spaced apart and which project from opposite sides of the band, the cells of the respective bands being arranged in staggered relation so that each cell of one band is arranged in the space formed between the cells of the next adjacent band, and a filling of solid elastic material between the said bands and in the spaces between the cells thereof.

In testimony whereof I affix my signature.

ERNEST HIBBERT.